April 21, 1970     J. J. ALLPORT ET AL     3,508,086
MAGNETOHYDRODYNAMIC ELECTRIC GENERATORS
Filed Sept. 26, 1966
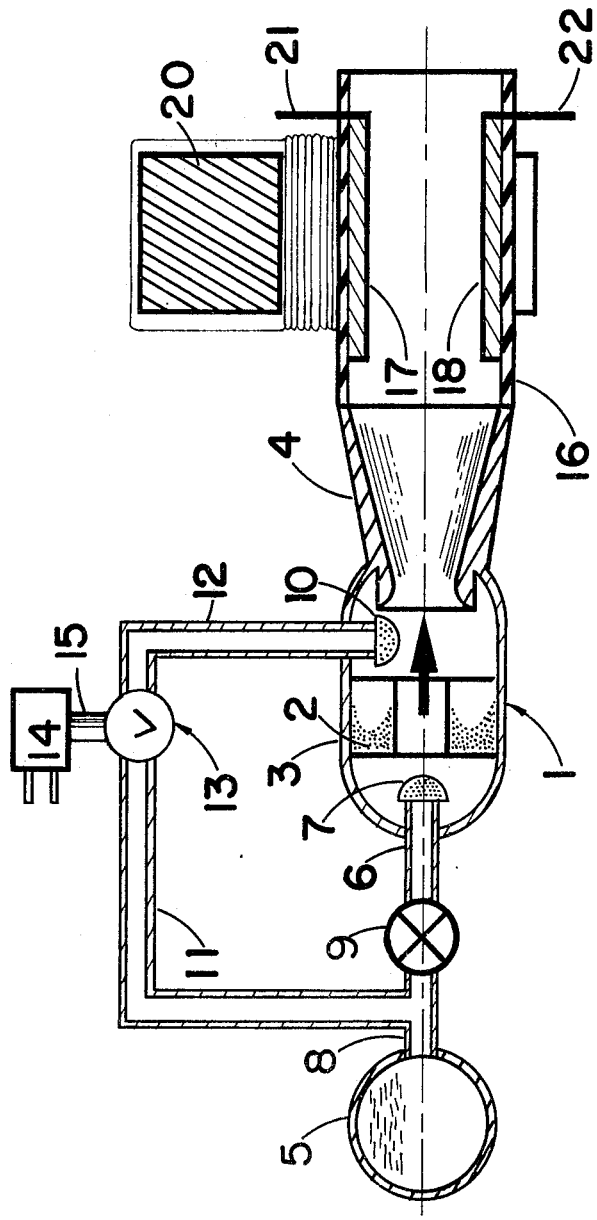
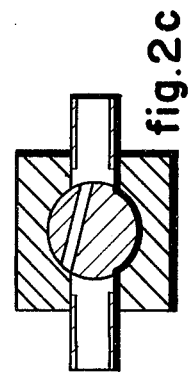
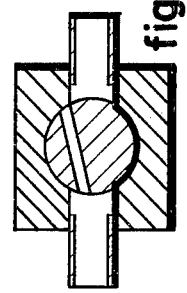
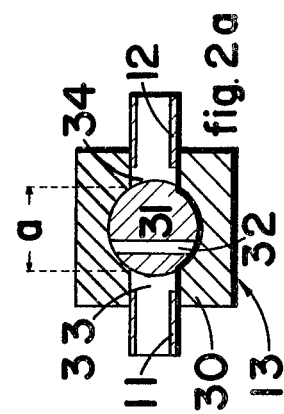
INVENTORS
JOHN J. ALLPORT
ALLEN L. HOLZMAN { # United States Patent Office

3,508,086
Patented Apr. 21, 1970

3,508,086
MAGNETOHYDRODYNAMIC ELECTRIC GENERATORS
John J. Allport, Saratoga, and Allen L. Holzman, Palo Alto, Calif., assignors to United Aircraft Corporation, East Hartford, Conn., a corporation of Delaware
Filed Sept. 26, 1966, Ser. No. 581,919
Int. Cl. H02n 4/02
U.S. Cl. 310—11    1 Claim

ABSTRACT OF THE DISCLOSURE

A magnetohydrodynamic electric generator is operated in a pulsed mode by passing a gas stream through an MHD duct. The gas stream is generated by reacting two components at a non-stoichiometric mixture ratio and is brought to high temperature by pulsing one of the components into the stream in amounts sufficient to bring the mixture to stoichiometric for the duration of the pulse. A rotating valve element having ports shorter than the diameter of the valve element is used to supply pulses as short as two milliseconds at frequencies as high as 100 pulses per second.

Background of the invention

This invention relates to magnetohydrodynamic (MHD) electric generators and more particularly to the MHD generation of short duration electrical pulses.

The use of a hybrid rocket motor to supply the ionized gases for an MHD electric power generating system is disclosed in co-pending, co-assigned patent application of Allen L. Holzman et al., Ser. No. 402,246, filed Oct. 7, 1964. Such a system is capable of operating at various power levels, but is incapable of producing the short, high intensity power pulses having pulse widths of less than 50 milliseconds which are required for certain high power electronic applications such as laser and radar systems. Such high energy pulses are extremely difficult to obtain from power sources such as batteries and generators because mechanical switches are not capable of handling the high energy loads without destruction.

The normal ignition delays and system transients of a large rocket system do not allow such a system to pulse on and off in such small time periods and further no suitable valves are available which can flow the required amounts of fluids in the short time periods encountered. A rotary valve driven by a high speed motor can deliver adequate short duration pulses, but the frequency of the pulses and the pulse width cannot be independently controlled. Conventional rotary valves which oscillate within a 90° arc between on and off conditions cannot be operated rapidly enough by an actuator commercially available.

It is accordingly an object of this invention to provide a rocket powered MHD system capable of delivering short duration electric power pulses.

It is another object of this invention to provide a pulsing system capable of delivering short duration fluid pulses suitable for use in an MHD generation system. These and other objects of this invention will be readily apparent from the following description of the invention with reference to the accompanying drawings wherein:

FIGURE 1 is a schematic sectional view of an MHD system according to this invention and, FIGURES 2a, 2b and 2c show a cross sectional view of a pulse valve according to this invention.

Description of the invention

Referring now to FIGURE 1, a hybrid rocket motor MHD electric pulse generating system is shown. It should be recognized, however, that while the hybrid rocket system is the preferred embodiment of this invention, any propellant system, other than a monopropellant system, in which at least one of the propellants is a flowable fluid can be employed according to this invention as long as sufficient readily ionizable material is present to produce the requisite ionization of the exhaust stream. For example, liquid and gaseous bipropellants systems can be employed as can reverse hybrids wherein the oxidizer is solid and the fuel is a fluid and the so called tribrid systems employing three propellant components.

A rocket MHD electric pulse generating system according to this invention may comprise a hybrid rocket motor 1 defined by a casing 3 containing a fuel grain 2 seeded with a readily ionizable material such as an alkali metal salt as is described in the aforesaid patent application. The aft end of casing 3 is terminated by nozzle 4. A pressurized source of fluid oxidizer 5 communicates with injector 7 in the forward end of rocket motor 1 through conduits 6 and 8, and flow control valve 9. Oxidizer source 5 is also in fluid communication with injector 10 located within casing 3 in the area between the aft end of grain 2 and nozzle 4 by means of conduits 11 and 12 and pulse valve 13 which is connected to an actuator 14 by shaft 15. Actuator 14 may be a conventional pneumatic actuator such as a Roto-cyl linear to rotary actuator available from Graham Engineering Co. suitable pulse valves will be described in greater detail below.

The nozzle 4 directs exhaust gases into the electrical generating portion of the system which comprises a heat resistant duct 16 having heat resistant electrical contacts 17 and 18 disposed along opposing internal faces of duct 16 such that the ionized gases will sweep across the two opposing contacts. Means 20 are provided for generating a magnetic field transverse to the direction of gas flow, the lines of magnetic flow being substantially perpendicular to the plane of the drawing. Suitable means include permanent magnets, electromagnets or solenoid coils, but for ease of illustration electromagnet 20 is shown extending around the duct and having opposing pole pieces. Electrical leads 21 and 22 connect the generator to the load.

In operation, valve 9 is opened to permit flow of oxidizer to the hybrid grain 2. If the fuel and oxidizer are non-hypergolic, conventional ignition means (not shown) may be provided. The flow through injector 7 is selected such that the oxidizer ratio (O/F) is rich in one component, in this case fuel, such that a low flame temperature and electrical power output, as compared to stoichiometric, is obtained. Pulse power generation is obtained by actuation of pulse valve 13 by actuator 14, to inject through injector 10 sufficient oxidizer to bring the O/F to stoichiometric for the duration of the pulse. The pulse of this additional oxidizer substantially increases the temperature and the degree of ionization of the exhaust gases so that effective electrical pulse power generation occurs. There is, however, little effect on the chamber pressure of the rocket for short pulse. The combustion chamber volume acts as a buffer for the short duration increased gas generation and accordingly there is little effect on the regression rate of the grain due to any pressure sensitivity.

If the load does not require pulses having a frequency greater than about 5 pulses per second, a more economical system involves pulsing the upstream oxidizer flow as well as the downstream flow, thereby, avoiding the consumption of the grain during periods of non-use. Thus, for example, if one short power pulse is required every 3 seconds the upstream valve is opened prior to the time of pulse generation for the period of time necessary to establish stable combustion, the downstream valve is pulsed to produce the power pulse and then the entire system is shut down for the time remaining in the 3 second interval whereupon the cycle is repeated. Appropriate ignition means would of course be required if the propellant system is non-hypergolic.

EXAMPLE I

A pulse MHD system was operated using gaseous oxygen as oxidizer and a carboxy terminated polybutadiene grain seeded with 18% by weight of $CsNO_3$ as the fuel. A magnetic field of 20,000 gauss was established between the electrodes and across the duct. Steady state combustion was established with an upstream oxidizer flow rate of 0.5 lb./sec. and a fuel flow rate of 0.5 lb./sec. The O/F of 1 is very fuel rich and the cool flame produced an electrical output of about 0.2 kw. Oxidizer was pulsed through the aft injector at a rate of 0.5 lb./sec. bringing the O/F to about stoichiometric for pulse lengths varying from over 1 second in length down to 5 milliseconds with pulse frequencies varying up to 30 cycles per second. The power output increased to 10 kw. for the duration of each oxidizer pulse.

When pulse widths of less than 50 milliseconds were required at low frequencies it was found that conventional solenoid and rotary valves could not produce the desired pulse patterns. It appears, however, that rotary valves are best adapted to the pulse requirements of the system. Rotary valves are conventionally rotated from the off position 90° to the on position and then returned back to the off position. No actuators are presently available that could produce pulses of the order of less than 50 milliseconds by such operations. Suitable pulses can be produced however, if the valve is rotated 180° from the off position through the on position to another off position.

Using commercially available pneumatic actuators controlled by a conventional pneumatic solenoid valve such valves produced pulse lengths as low as 15 milliseconds using nitrogen as the actuating fluid. Pulse lengths were reduced to 10 milliseconds when helium was substituted for nitrogen. However, for lower pulse lengths down to about 2 milliseconds, a special valve was developed. The valve may be either a ball or cylinder valve having the port extending through the rotating member located on a chord having a length less than the diameter. For a given rotational speed shorter chords produce shorter pulse lengths. Such a valve is illustrated in FIGURES 2a, 2b and 2c. Valve 13 may comprise a body 30 having a rotable element 31 mounted therein. Shaft 15 (FIGURE 1) extends through the body 30 in a plane normal to that of FIGURE 2 for rotation of element 31 by the actuator 14. Element 31 has a port 32 extending therethrough located on a chord shorter than the diameter and longer than distance "a," the shortest chord length between the intake and exhaust ports 33 and 34 in valve body 30. Conduits 11 and 12 are attached to valve body 30. In FIGURE 2a the valve is in the off position. When the element 31 is rotated to the position shown in FIGURE 2b flow starts and continues until rotation to the position of FIGURE 2c. For a successive pulse the rotation direction is reversed as is readily accomplished by conventional linear to rotary actuators or the valve may be rotated in the same direction for another pulse. Calibration of such a valve is quite simple. Port 32 is sized to permit the desired flow rate under the operating conditions. Knowing the size of the port 32, the rotational speed of the actuator and the size of ports 33 and 34, the chord length of port 32 for a desired pulse length can be readily calculated.

EXAMPLE II

A ball valve having rotating element with a ½" outside diameter was provided with a 0.070" diameter port having a center line 0.075" from the diameter of the ball. Such a port was adequate to supply 0.05 lb./sec. of gaseous oxygen under the operating conditions. The intake and exhaust ports to the valve had a diameter of 0.27". Such a valve produced a pulse length of 5 milliseconds when the valve rotated through 180° at a speed equivalent to 750 r.p.m. using nitrogen as the actuating medium and a pulse length of 3 milliseconds at a speed equivalent to 1200 r.p.m. when helium was the actuating medium.

Pulse widths can be produced according to this invention varying from 1 millisecond up to seconds and for present application preferable widths are from 2 to 50 milliseconds. Frequencies of from less than 1 c.p.s. to 100 c.p.s. can be obtained with preferred frequencies for present applications being from 1–20 c.p.s. As noted above, system shut down between successive pulses can be employed with pulse frequencies less than 5 c.p.s.

This invention has been described with respect to specific embodiments thereof, however, these embodiments are merely illustrative and should not be construed as limiting of the invention. Various modification may be made without departing from the scope of the invention which is limited only by the following claim.

We claim:
1. In a rocket powered magnetohydrodynamic electrical generator comprising a combustion chamber, a source of at least first and second propellants, at least one of said propellants containing a readily ionizable material, means for generating an electric current from a stream of ionized gas and fluid conducting means connecting said combustion chamber to said generating means, the improvement comprising:
  (a) means for supplying said propellants to said combustion chamber in non-stoichiometric ratio, and
  (b) means for supplying pulses of one of said propellants to said combustion chamber in amounts sufficient to bring the propellant mixture to approximately stoichiometric ratio for the duration of the pulse, said means comprising a rotary valve in fluid communication with said combustion chamber and a source of one of said propellants, said rotary valve comprising a valve body having a cavity, a rotatable valve element having a circular cross section mounted in said cavity in fluid tight relationship with said body, fluid inlet and outlet ports extending from the exterior of said body to said cavity at spaced apart locations and a port extending through said rotatable valve element, said port being on a chord of said rotatable valve element shorter than the diameter and longer than the shortest distance between said inlet and outlet ports, opposite ends of said chord being alignable with said inlet and outlet ports, and means for rotating said rotatable valve member from an off position through an on position to an off position.

References Cited
UNITED STATES PATENTS

| | | | |
|---|---|---|---|
| 1,854,727 | 4/1932 | Alkire | 251—309 X |
| 2,117,456 | 5/1938 | Schellin | 251—103 |
| 3,201,622 | 8/1965 | Thring | 310—11 |
| 3,310,689 | 3/1967 | Heinmets | 310—4 |
| 3,356,871 | 12/1967 | Hundstad | 310—11 |

DAVID X. SLINEY, Primary Examiner